United States Patent
Ueno et al.

(10) Patent No.: US 12,187,550 B2
(45) Date of Patent: Jan. 7, 2025

(54) LINEAR CONVEYOR SYSTEM, A CONTROL METHOD FOR A LINEAR CONVEYOR SYSTEM, A CONTROL PROGRAM FOR A LINEAR CONVEYOR SYSTEM AND A RECORDING MEDIUM

(71) Applicant: YAMAHA HATSUDOKI KABUSHIKI KAISHA, Iwata (JP)

(72) Inventors: Kenji Ueno, Iwata (JP); Takayoshi Fujita, Iwata (JP); Shunsuke Aoki, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 678 days.

(21) Appl. No.: 17/436,063

(22) PCT Filed: Apr. 23, 2019

(86) PCT No.: PCT/JP2019/017142
§ 371 (c)(1),
(2) Date: Sep. 2, 2021

(87) PCT Pub. No.: WO2020/217295
PCT Pub. Date: Oct. 29, 2020

(65) Prior Publication Data
US 2022/0177240 A1 Jun. 9, 2022

(51) Int. Cl.
*B65G 54/02* (2006.01)
*G05B 19/042* (2006.01)
*G05D 3/20* (2006.01)

(52) U.S. Cl.
CPC ........... *B65G 54/02* (2013.01); *G05B 19/042* (2013.01); *G05D 3/20* (2013.01); *B65G 2207/30* (2013.01); *G05B 2219/2621* (2013.01)

(58) Field of Classification Search
CPC ...... B65G 54/02; B65G 47/642; B65G 43/08; G05B 19/042; G65G 47/905
See application file for complete search history.

(56) References Cited

U.S. PATENT DOCUMENTS 8,408,381 B2 * 4/2013 Murakami ............. B65G 37/02
198/465.1
8,616,134 B2 * 12/2013 King ...................... B65G 35/06
104/284

(Continued)

OTHER PUBLICATIONS

International Search Report issued in PCT/JP2019/017142; mailed Jul. 30, 2019.

*Primary Examiner* — Patrick H Mackey
(74) *Attorney, Agent, or Firm* — Studebaker & Brackett PC

(57) ABSTRACT

A transfer operation of moving the slider between one fixed linear module and a movable linear module while locating the movable linear module in the facing range facing the one fixed linear module is performed. At this time, it is judged whether or not the coordinate axis of the one fixed linear module and the coordinate axis of the movable linear module are continuous If it is judged before the transfer operation that the coordinate axes are not continuous, the transfer operation is performed after the coordinate axes are made continuous in the direction by changing the coordinate axis. Thus, it is possible to suppress the occurrence of a situation where the transfer operation of moving the slider between the fixed linear module and the movable linear module cannot be performed due to the discontinuity of the coordinate axes respectively set for the fixed and movable linear modules.

15 Claims, 9 Drawing Sheets

(56) References Cited

U.S. PATENT DOCUMENTS

| | | | | |
|---|---|---|---|---|
| 8,896,241 B2* | 11/2014 | Wernersbach | ........... | H02P 31/00 |
| | | | | 318/135 |
| 9,621,097 B2* | 4/2017 | Takagi | ............... | H02P 25/06 |
| 10,965,201 B2* | 3/2021 | Ota | .................. | H02P 25/06 |
| 11,485,590 B2* | 11/2022 | Aschpurwis | ......... | B65G 47/945 |
| 11,702,300 B2* | 7/2023 | Ueno | ................ | B65G 43/08 |
| | | | | 198/619 |
| 11,724,894 B2* | 8/2023 | Ueno | ................ | B65G 54/02 |
| | | | | 198/619 |
| 11,745,960 B2* | 9/2023 | Ueno | ................ | H02K 41/031 |
| | | | | 198/619 |
| 11,945,665 B1* | 4/2024 | Lais | ................. | B65G 54/02 |
| 2016/0159585 A1* | 6/2016 | Wernersbach | ....... | B65G 54/025 |
| | | | | 198/619 |
| 2021/0067007 A1* | 3/2021 | Okazaki | .............. | B65G 54/02 |

* cited by examiner

LINEAR CONVEYOR SYSTEM, A CONTROL METHOD FOR A LINEAR CONVEYOR SYSTEM, A CONTROL PROGRAM FOR A LINEAR CONVEYOR SYSTEM AND A RECORDING MEDIUM

CROSS-REFERENCE TO RELATED APPLICATION

This application is a National Stage of International Patent Application No. PCT/JP2019/017142, filed Apr. 23, 2019, the entire contents of which is incorporated herein by reference.

BACKGROUND

Technical Field

This disclosure relates to a linear conveyor system with a mechanism for driving a slider by linear modules.

Background Art

US2016/0159585A1 discloses a linear drive conveyor system in which a plurality of tracks for driving a moving body in a predetermined driving direction are arranged in parallel. This system is provided with a junction track for transferring the moving body between the plurality of tracks. This junction track can receive the moving body from one track while facing the one track or perform a reverse operation thereof.

SUMMARY

As just described, the system described in US2016/0159585A1 uses a movable linear module for transferring a slider (moving body) between a plurality of fixed linear modules (track) arranged in parallel. In such a system, the following problem has occurred in some cases in performing a transfer operation of moving the slider between the fixed linear module and the movable linear module.

That is, the transfer operation of the slider can be performed by a position control for the slider driven by the fixed linear modules and the movable linear module. Such a position control is executed based on coordinate axes set for the respective fixed linear modules and movable linear module. However, there have been cases where the position control cannot be executed based on these coordinate axes and the transfer operation of the slider cannot be performed since the coordinate axes set for the respective linear modules relating to the transfer operation are not continuous.

This disclosure was developed in view of the above problem and aims to provide a technique capable of suppressing the occurrence of a situation where a transfer operation of moving a slider between a fixed linear module and a movable linear module cannot be performed due to the discontinuity of coordinate axes set for the respective fixed linear module and movable linear module.

A linear conveyor system according to the disclosure, comprises a slider to be driven in a first direction; a plurality of fixed linear modules arrayed in a second direction intersecting the first direction; a movable linear module moving between a plurality of facing ranges arranged in the second direction while facing toward the plurality of fixed linear modules from the first direction, the movable linear module driving the slider in the first direction; a slider transfer mechanism conveying the movable linear module between the plurality of facing ranges; and a controller which sets a coordinate axis representing positions in the first direction by coordinate values. The coordinate value change according to a position change in the first direction, for each of the plurality of fixed linear module and the movable linear module and executes a position control based on the coordinate axes for the slider driven by the fixed linear module and the movable linear module. The slider is engageable with and disengageable from one end of each of the fixed linear modules and the movable linear module in the first direction and the fixed linear modules and the movable linear module drive the engaged slider in the first direction. A transfer operation of moving the slider between the fixed linear module and the movable linear module is performed, such that the controller performs the transfer operation after one coordinate axis and an other coordinate axis are made continuous in the first direction by changing at least one object coordinate axis of the one coordinate axis and the other coordinate axis if it is judged before the transfer operation that the one coordinate axis and the other coordinate axis are not continuous as a result of performing a judgment process of judging whether or not the one coordinate axis, which is the coordinate axis of the fixed linear module, and the other coordinate axis, which is the coordinate axis of the movable linear module, are continuous in the first direction.

A control method for a linear conveyor system according to the disclosure is a control method for a linear conveyor system with a slider to be driven in a first direction, a plurality of fixed linear modules arrayed in a second direction intersecting the first direction, a movable linear module moving between a plurality of facing ranges arranged in the second direction while facing toward the plurality of fixed linear modules from the first direction, the movable linear module driving the slider in the first direction, and a slider transfer mechanism conveying the movable linear module between the plurality of facing ranges. The control method comprises setting a coordinate axis for each of the plurality of fixed linear module and the movable linear module, the coordinate axis representing positions in the first direction by coordinate values, the coordinate value changing according to a position change in the first direction; performing a judgment process of judging whether or not one coordinate axis, the one coordinate axis being the coordinate axis of the fixed linear module, and an other coordinate axis, the other coordinate axis being the coordinate axis of the movable linear module, are continuous in the first direction; making the one coordinate axis and the other coordinate axis continuous in the first direction by changing at least one object coordinate axis of the one coordinate axis and the other coordinate axis if it is judged that the one coordinate axis and the other coordinate axis are not continuous as a result of the judgment process; and performing a transfer operation of moving the slider between the fixed linear module and the movable linear module by a position control based on the coordinate axes after the object coordinate axis is changed.

A control program for a linear conveyor system according to the disclosure is a control program for a linear conveyor system with a slider to be driven in a first direction, a plurality of fixed linear modules arrayed in a second direction intersecting the first direction, a movable linear module moving between a plurality of facing ranges arranged in the second direction while facing toward the plurality of fixed linear modules from the first direction, the movable linear module driving the slider in the first direction, and a slider transfer mechanism conveying the movable linear module between the plurality of facing ranges. The control program causes a computer to set a coordinate axis for each of the plurality of fixed linear module and the movable linear module, the coordinate axis representing positions in the first direction by coordinate values, the coordinate value changing according to a position change in the first direction; perform a judgment process of judging whether or not one coordinate axis, the one coordinate axis being the coordinate axis of the fixed linear module, and an other coordinate axis, the other coordinate axis being the coordinate axis of the movable linear module, are continuous in the first direction; make the one coordinate axis and the other coordinate axis continuous in the first direction by changing at least one object coordinate axis of the one coordinate axis and the other coordinate axis if it is judged that the one coordinate axis and the other coordinate axis are not continuous as a result of the judgment process; and perform a transfer operation of moving the slider between the fixed linear module and the movable linear module by a position control based on the coordinate axes after the object coordinate axis is changed.

A recording medium according to the disclosure computer-readably records the control program for linear conveyor system.

In the disclosure thus configured (linear conveyor system, control method for linear conveyor system, control program for linear conveyor system and recording medium), the transfer operation of moving the slider between one fixed linear module and the movable linear module while locating the movable linear module in the facing range facing the one fixed linear module, out of the plurality of fixed linear modules arranged in parallel, is performed. At this time, the judgment process of judging whether or not the one coordinate axis, which is the coordinate axis of the one fixed linear module, and the other coordinate axis, which is the coordinate axis of the movable linear module, are continuous in the first direction is performed. If it is judged in the judgment process before the transfer operation that the one coordinate axis and the other coordinate axis are not continuous, the transfer operation is performed after the one coordinate axis and the other coordinate axis are made continuous in the first direction by changing at least one object coordinate axis of the one coordinate axis and the other coordinate axis. Therefore, it is possible to suppress the occurrence of a situation where the transfer operation of moving the slider between the fixed linear module and the movable linear module cannot be performed due the discontinuity of the coordinate axes set for the respective fixed linear module and movable linear module.

The linear conveyor system may be configured so that the controller performs the judgment process in a normal set state where the coordinate axes are so set that the coordinate values represented by the respective coordinate axes of the plurality of fixed linear modules and the movable linear module do not overlap each other. In such a configuration, for example, a control for the slider before the start of the transfer operation can be easily executed based on the coordinate axes not overlapping each other, i.e. the coordinate axes uniquely representing the positions in the first direction.

The linear conveyor system may be configured so that the controller returns the object coordinate axis to the one before a change after the transfer operation is completed if the object coordinate axis is changed. In such a configuration, for example, a control for the slider after the completion of the transfer operation can be easily executed based on the coordinate axes not overlapping each other, i.e. the coordinate axes uniquely representing the positions in the first direction.

The linear conveyor system may be configured so that the controller changes a movement destination coordinate axis including a movement target position of the slider, out of the one coordinate axis and the other coordinate axis. Further, the linear conveyor system may be configured so that the controller changes a coordinate value indicating the movement target position as the movement destination coordinate axis is changed. In this way, the transfer operation of the slider can be precisely performed by executing the position control to move the slider to the movement target position corresponding to the coordinate axis after the change.

The linear conveyor system may be configured so that the coordinate axis represents the positions in the first direction by the coordinate values that linearly change with a predetermined gradient according to the position change in the first direction. Further the linear conveyor system may be configured so that the controller judges that the one coordinate axis and the other coordinate axis are not continuous if a gradient between the coordinate value of an end of the one coordinate axis on the side of the other coordinate axis and the coordinate value of an end of the other coordinate axis on the side of the one coordinate axis is different from the predetermined gradient. In this way, the continuity of the coordinate axes can be easily judged.

According to the disclosure, it is possible to suppress the occurrence of a situation where the transfer operation of moving the slider between the fixed linear module and the movable linear module cannot be performed due to the discontinuity of the coordinate axes set for the respective fixed linear module and movable linear module.

DETAILED DESCRIPTION

Figure 1:
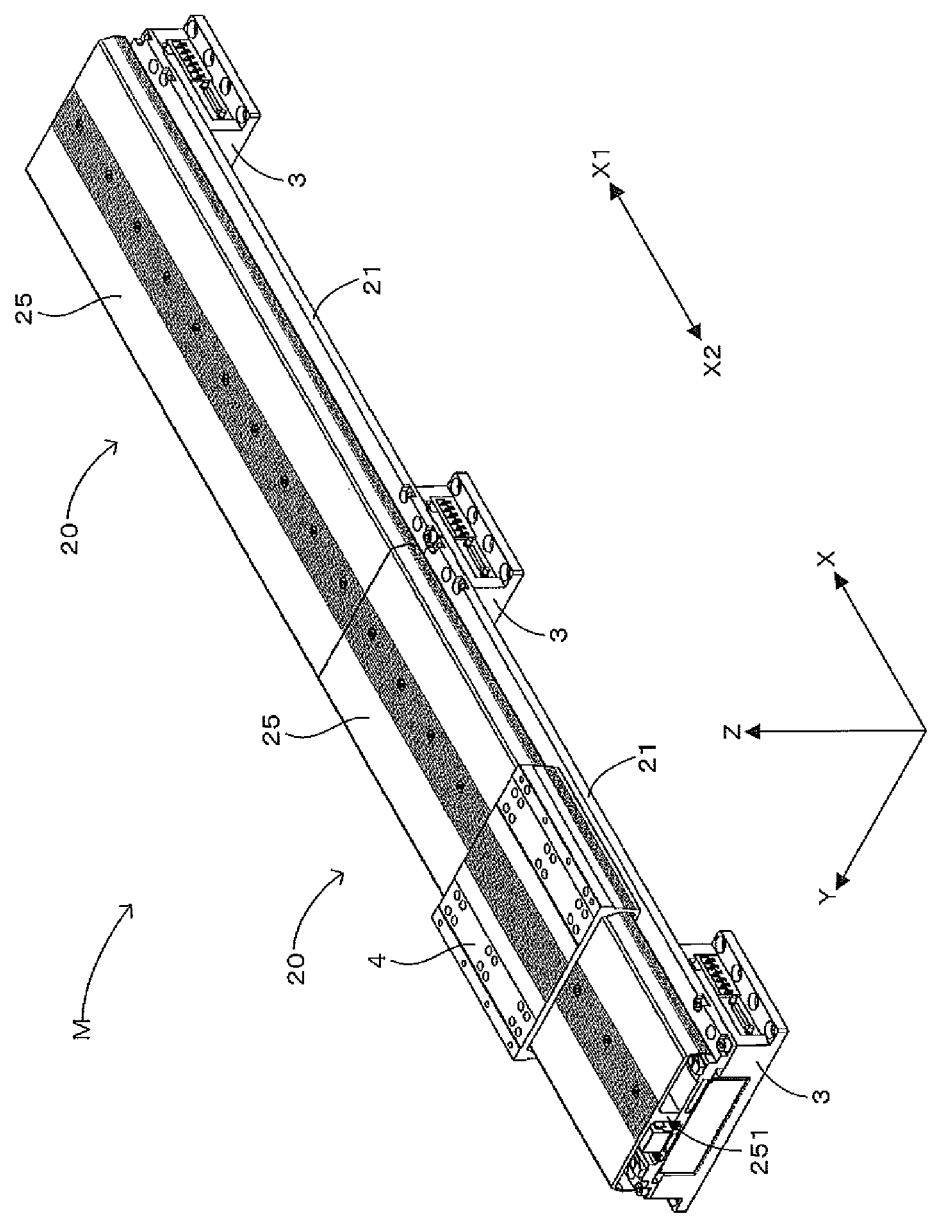
FIG. 1 is a perspective view showing an example of a linear module provided in a linear conveyor system according to the disclosure.
Figure 2:
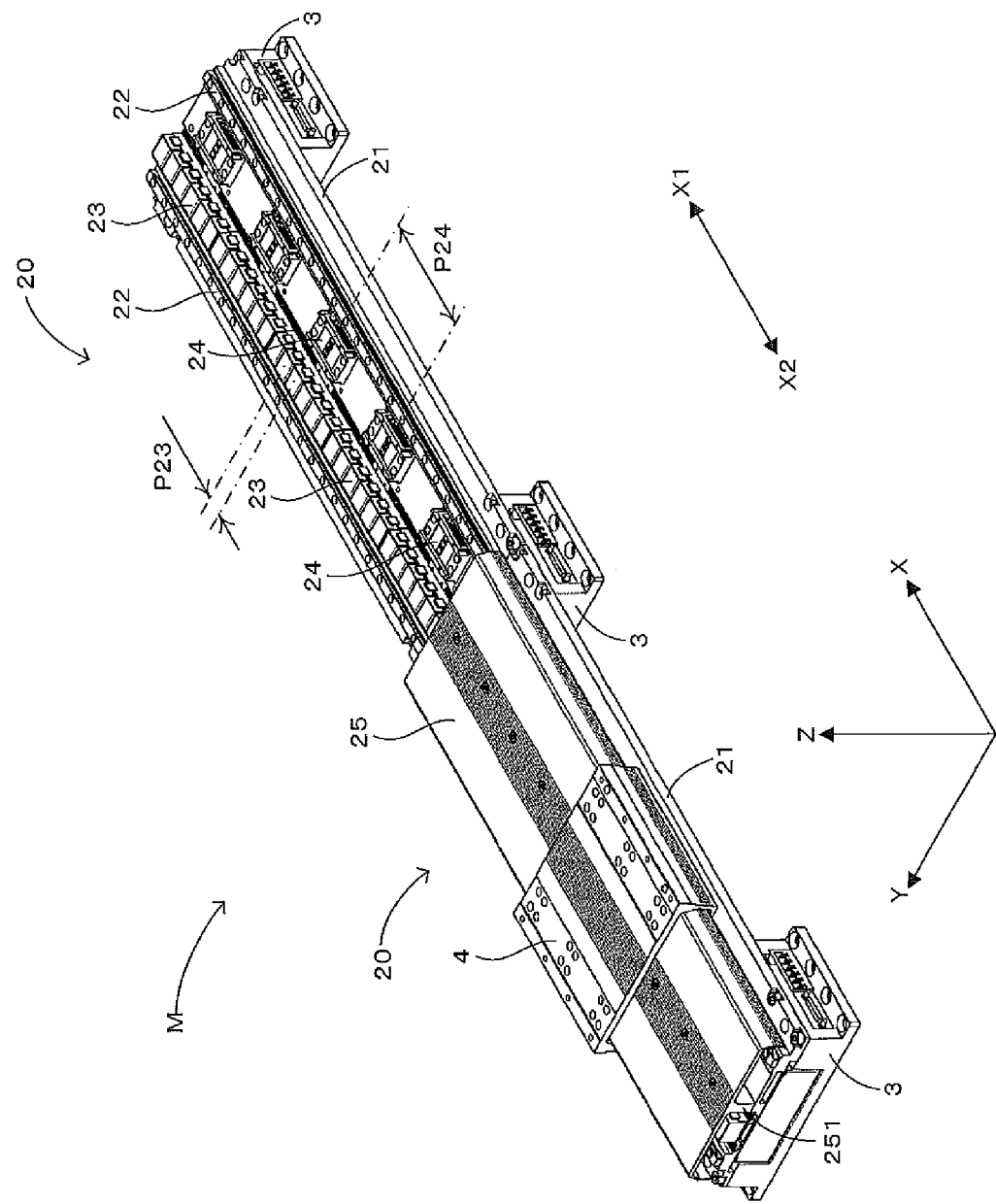
FIG. 2 is a perspective view showing the linear module of FIG. 1 with the inside of the linear module partially exposed.

FIG. 1 is a perspective view showing an example of a linear module provided in a linear conveyor system according to the disclosure, and FIG. 2 is a perspective view showing the linear module of FIG. 1 with the inside of the linear module partially exposed. In FIGS. 1 and 2, XYZ orthogonal coordinate axes including an X direction parallel to a horizontal direction, a Y direction parallel to the horizontal direction while being orthogonal to the X direction and a Z direction parallel to a vertical direction are shown. Further, an oblique right-upper side along the X direction in FIGS. 1 and 2 is written as an X1 side and an oblique left-lower side along the X direction in FIGS. 1 and 2 is written as an X2 side. Similar notations are also used as appropriate in the following drawings. This linear module has a basic configuration similar to, for example, that of a module of a linear conveyor device described in WO2018/055709A1. Here, the entire linear conveyor system is described after the linear module is described.

A linear module M extending in the X direction, base members 3 supporting the linear module M from below and a slider 4 engaged with the linear module M are shown in FIGS. 1 and 2. The linear module M is mounted on the upper ends of three base members 3 arranged at equal intervals in the X direction and drives the slider 4 in the X direction by a magnetic force. In this example, the linear module M is composed of two module units 20 arrayed in the X direction. However, the number of the module units 20 constituting the linear module M is not limited to two, and may be one, three or more.

The module unit 20 includes a base plate 21 extending in the X direction. The base plate 21 is a flat plate having a rectangular shape in a plan view from the Z direction. Two guide rails 22 parallel to the X direction are arranged on the upper surface of the base plate 21 while being spaced apart in the Y direction. Further, a plurality of linear motor stators 23 arranged in a row in the X direction at a predetermined arrangement pitch P23 and a plurality of magnetic sensors 24 arranged in a row in the X direction at a predetermined arrangement pitch P24 are mounted on the upper surface of the base plate 21. Here, the arrangement pitch P24 of the magnetic sensors 24 is longer than the arrangement pitch P23 of the linear motor stators 23. In the Y direction, the plurality of linear motor stators 23 are arranged between the two guide rails 22 and the plurality of magnetic sensors 24 are arranged between the linear motor stators 23 and one guide rail 22.

The linear motor stator 23 is an electromagnet including a coil and a core inserted in the coil. On the other hand, the slider 4 is provided with a mover including a permanent magnet and a back yoke for holding the permanent magnet. The linear motor stators 23 drive the slider 4 in the X direction by giving a magnetic thrust to the mover of the slider 4 by generating a magnetic flux corresponding to an applied current. Further, a magnetic scale indicating positions in the X direction is mounted on the slider 4, and the magnetic sensor 24 detects the position of the slider 4 in the X direction by reading the magnetic scale. The slider 4 is driven in the X direction by feedback-controlling the current applied to the linear motor stators 23 based on the position of the slider 4 detected by the magnetic sensors 24 as described later.

Further, the module unit 20 includes a cover member 25 having a rectangular shape in a plan view which covers these guide rails 22, linear motor stators 23 and magnetic sensors 24 from above. The cover member 25 includes a support leg 251 projecting downward in a center in the Y direction, and the support leg 251 is mounted on the upper surface of the base plate 21. Clearances are formed between the cover member 25 and the base plate 21 on both ends in the Y direction, and both end parts of the slider 4 inserted between the cover member 25 and the base plate 21 through these clearances are respectively engaged with the two guide rails 22.

The liner module M includes a plurality of (two) module units 20 arrayed in the X direction. Such a linear module M has a rectangular shape in a plan view. The module unit 20 on the X1 side, out of the two module units 20 of the linear module M, is laid between the base member 3 on the X1 side end and a central base member 3, out of the three base members 3, and the module unit 20 on the X2 side is laid between the base member 3 on the X2 side end and the central base member 3, out of the three base members 3.

The slider 4 can be engaged with the guide rails 22 of the linear module M by approaching form an end of the linear module M toward a central side of the linear module M in the X direction. The slider 4 engaged with the guide rails 22 in this way is driven in the X direction by the linear module M. Further, the slider 4 can be separated from the guide rails 22 of the linear module M by exiting to outside from an end of the linear module M in the X direction.

Figure 3:
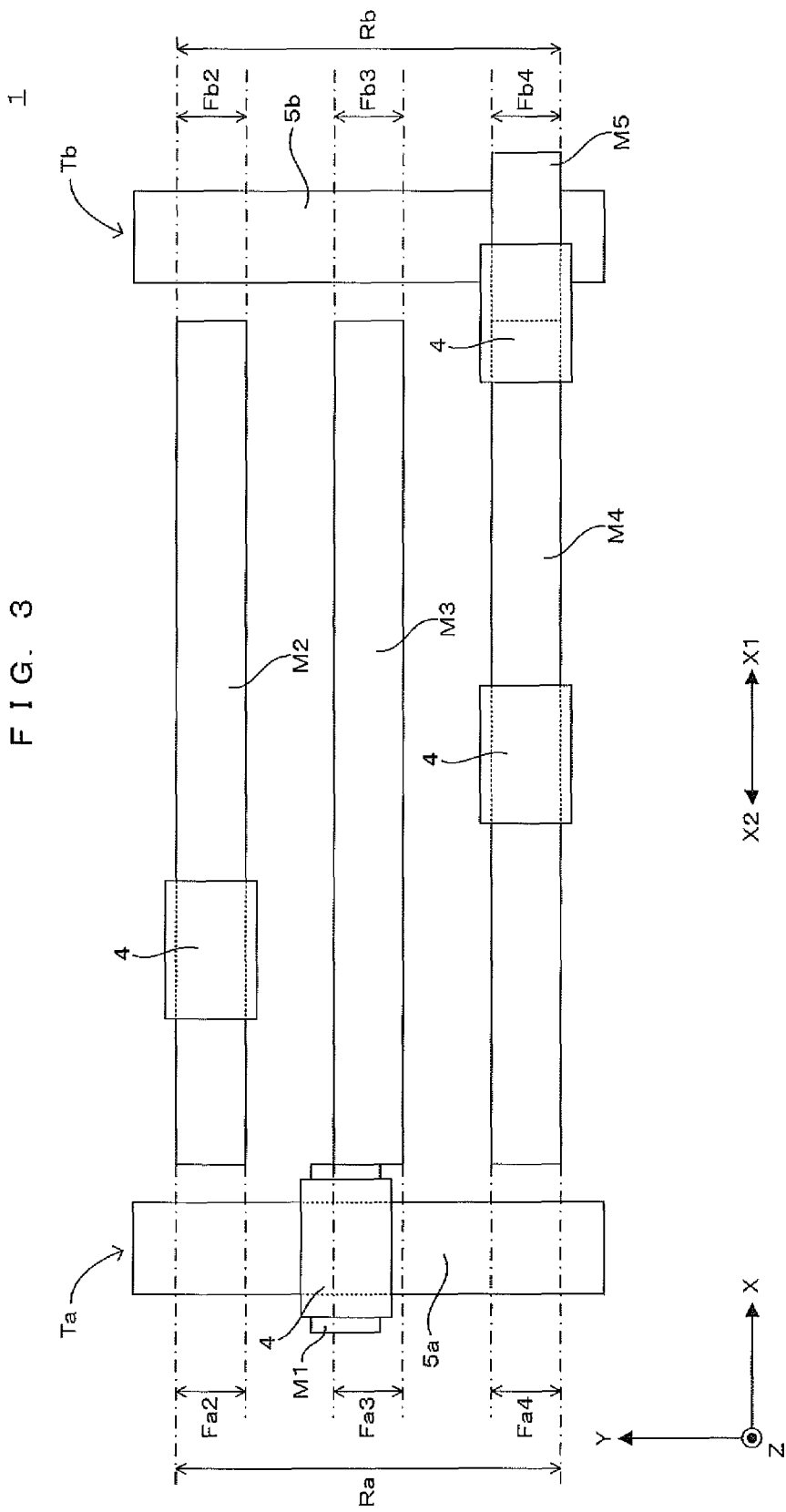
FIG. 3 is a diagram schematically showing an example of the linear conveyor system according to the disclosure.

FIG. 3 is a diagram schematically showing an example of the linear conveyor system according to the disclosure. The linear conveyor system 1 includes five linear modules M. Note that mutually different signs M1, M2, M3, M4 and M5 are given to the five linear modules M in FIG. 3.

The linear modules M2, M3 and M4 are fixed linear modules fixed to an installation surface of the linear conveyor system 1, and the linear modules M1, M5 are movable linear modules movable in the Y direction with respect to the installation surface. The fixed linear modules M2, M3 and M4 and the movable linear modules M1, M5 have different lengths in the X direction while having the same width in the Y direction. However, these have the common basic configuration shown in FIGS. 1 and 2 except the lengths in the X direction.

The three fixed linear modules M2, M3 and M4 are arranged in parallel to the X direction while being spaced apart in the Y direction. The fixed linear modules M2, M3 and M4 arranged in parallel to the X direction in this way have the same length in the X direction. On the other hand, the movable linear modules M1, M5 have the same length shorter than the fixed linear modules M2, M3 and M4 in the X direction. However, a dimensional relationship of the movable linear modules M1, M5 and the fixed linear modules M2, M3 and M4 is not limited to this example.

Such a linear conveyor system 1 includes two actuators 5a, 5b which drives the movable linear modules M1, M5 in the Y direction. The actuator 5a is arranged in parallel to the Y direction on the X2 sides of the fixed linear modules M2, M3 and M4 in the X direction. The actuator 5b is arranged in parallel to the Y direction on the X1 sides of the fixed linear modules M2, M3 and M4 in the X direction. In this way, the two actuators 5a, 5b are arranged to sandwich three fixed linear modules M2, M3 and M4 in the X direction.

The actuator 5a is, for example, a single-axis robot including a ball screw parallel to the Y direction, and the movable linear module M1 is attached to a nut of the ball screw of the actuator 5a. This actuator 5a drives the movable linear module M1 in the Y direction along a movable region Ra. Here, the movable region Ra is a region extending in the Y direction and including a facing range Fa2 facing toward an end on the X2 side of the fixed linear module M2 from the X2 side in the X direction, a facing range Fa3 facing toward an end on the X2 side of the fixed linear module M3 from the X2 side in the X direction and a facing range Fa4 facing toward an end on the X2 side of the fixed linear module M4 from the X2 side in the X direction. The facing range Fa2 is equivalent to a presence range (including a tolerance of the movable linear module M1) of the movable linear module M1 arranged in a row with the fixed linear module M2 in the X direction, the facing range Fa3 is equivalent to a presence range (including the tolerance of the fixed linear module M1) of the movable linear module M1 arranged in a row with the fixed linear module M3 in the X direction, and the facing range Fa4 is equivalent to a presence range (including the tolerance of the fixed linear module M1) of the movable linear module M1 arranged in a row with the fixed linear module M4 in the X direction.

The actuator 5b is, for example, a single-axis robot including a ball screw parallel to the Y direction, and the movable linear module M5 is attached to a nut of the ball screw of the actuator 5b. This actuator 5b drives the movable linear module M5 in the Y direction along a movable region Rb. Here, the movable region Rb is a region extending in the Y direction and including a facing range Fb2 facing toward an end on the X2 side of the fixed linear module M2 from the X1 side in the X direction, a facing range Fb3 facing toward an end on the X1 side of the fixed linear module M3 from the X1 side in the X direction and a facing range Fb4 facing toward an end on the X1 side of the fixed linear module M4 from the X1 side in the X direction. The facing range Fb2 is equivalent to a presence range (including a tolerance of the movable linear module M5) of the movable linear module M5 arranged in a row with the fixed linear module M2 in the X direction, the facing range Fb3 is equivalent to a presence range (including the tolerance of the fixed linear module M5) of the movable linear module M5 arranged in a row with the fixed linear module M3 in the X direction and the facing range Fb4 is equivalent to a presence range (including the tolerance of the fixed linear module M5) of the movable linear module M5 arranged in a row with the fixed linear module M4 in the X direction.

In such a linear conveyor system 1, the slider 4 can be circularly driven. For example, the fixed linear module M2 drives the slider 4 engaged therewith toward the X1 side in the X direction with the movable linear module M5 located in the facing range Fb2, whereby the slider 4 can be moved from the fixed linear module M2 to the movable linear module M5. Then, the movable linear module M5 located in the facing range Fb4 drives the slider 4 engaged therewith toward the X2 side in the X direction after the actuator 5b moves the movable linear module M5 from the facing range Fb2 to the facing range Fb4, whereby the slider 4 can be moved from the movable linear module M5 to the fixed linear module M4.

Further, the fixed linear module M4 drives the slider 4 engaged therewith toward the X2 side in the X direction with the movable linear module M1 located in the facing range Fa4, whereby the slider 4 can be moved from the fixed linear module M4 to the movable linear module M1. Then, the movable linear module M1 located in the facing range Fa2 drives the slider 4 engaged therewith toward the X1 side in the X direction after the actuator 5a moves the movable linear module M1 from the facing range Fa4 to the facing range Fa2, whereby the slider 4 can be moved from the movable linear module M1 to the fixed linear module M2.

In this way, the slider 4 can be circularly driven clockwise. Further, the slider 4 can be circularly driven counterclockwise by performing an operation opposite to the above one. Such a circular drive is not limited to the one between the fixed linear modules M2 and M4, and can be similarly performed between the fixed linear modules M2 and M3 and between the fixed linear modules M3 and M4. Further, the circular drive is merely an example of a drive mode of the slider 4 executable by the linear conveyor system 1 and the slider 4 can be driven in various other modes.

Figure 4:
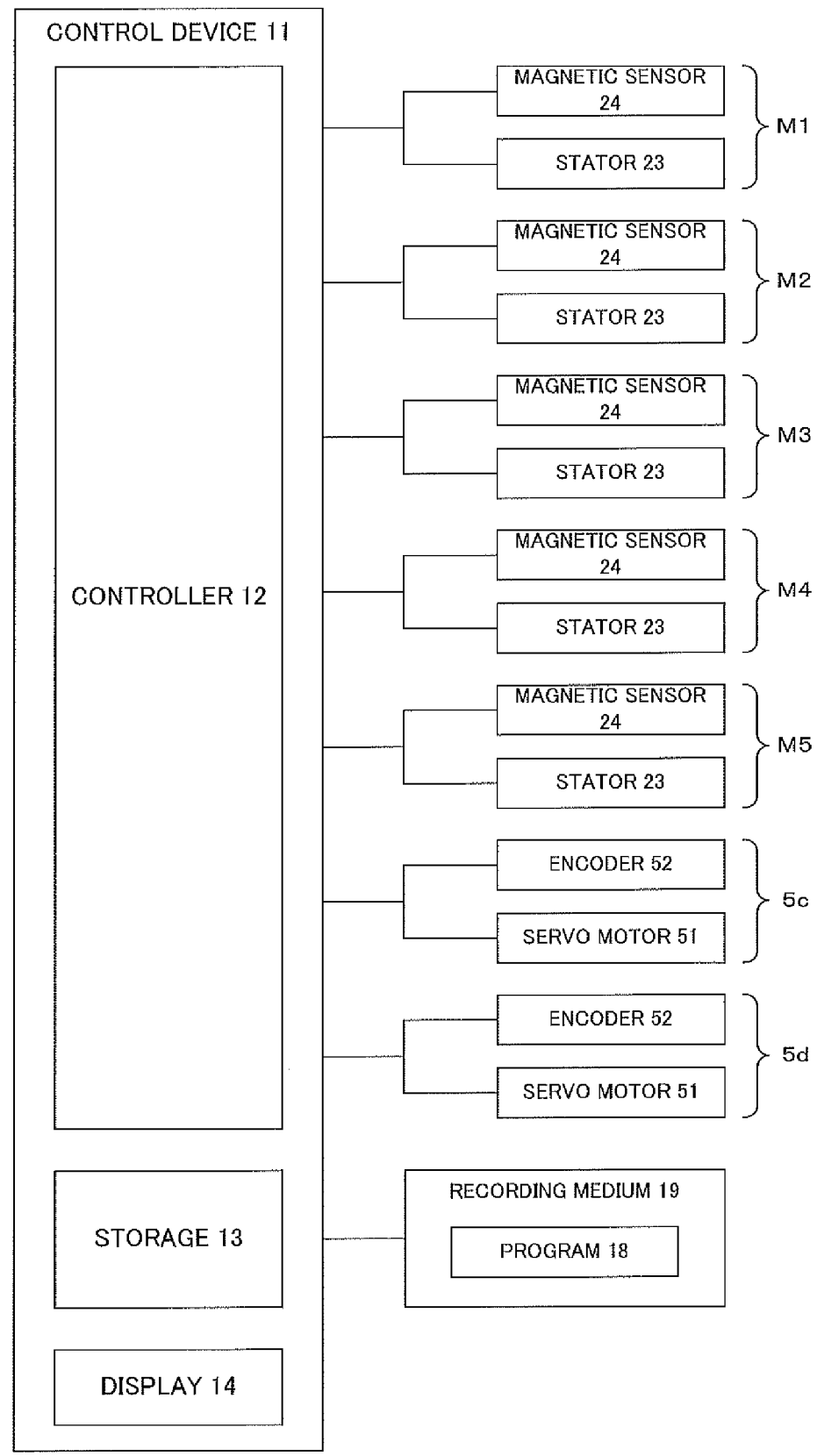
FIG. 4 is a block diagram showing an example of an electrical configuration of the linear conveyor system of FIG. 3.

FIG. 4 is a block diagram showing an example of an electrical configuration of the linear conveyor system of FIG. 3. The linear conveyor system 1 includes a control device 11 which controls the position of each slider 4 while monitoring the entire system. This control device 11 is a computer such as a personal computer.

The control device 11 includes a controller 12, a storage 13 and a display 14. The controller 12 is, for example, a processor configured by a CPU (Central Processing Unit) and performs computation in the control device 11. The storage 13 is, for example, configured by an HDD (Hard Disk Drive) and stores data and programs used in computation in the control device 2. Particularly, the storage 13 stores a program 18 for causing the controller 12 of the control device 11 to execute a drive control of FIG. 5 to be described later. This program 18 may be installed in the storage 13 by being provided in a state readable by the control device 11 by means of a recording medium 19 such as a USB (Universal Serial Bus) memory or may be installed in the storage 13 by being downloaded from an Internet server. The display 14 is, for example, a touch panel display and functions as a UI (User Interface) for not only showing displays to a user, but also receiving input operations from the user.

The controller 12 of such a control device 11 causes each of the linear modules M1 to M5 to drive the slider 4 by feedback-controlling the linear motor stators 23 based on the position of the slider 4 detected by the magnetic sensors 24. Further, each of the actuators 5a, 5b includes a servo motor 51 which rotates the ball screw and an encoder 52 which detects the rotational position of the servo motor 51. The controller 12 causes the respective actuators 5a, 5b to drive the movable linear modules M1, M5 by feedback-controlling the servo motors 51 based on the rotational positions detected by the encoders 52.

Such a controller 12 controls the drive of the slider 4 by executing a position control for each slider 4. Specifically, the controller 12 executes a feedback control of controlling a current to be supplied to the linear motor stators 23 of the movable linear modules M1 to M5 based on a deviation between a position of the slider 4 detected by the magnetic sensors 24 of the linear modules M1 to M5 and a position command value.

Particularly, a transfer operation of moving the slider 4 between one fixed linear module and the movable linear module M1, M5 while locating the movable linear module M1, M5 in the facing range facing the one fixed linear module, out of the plurality of fixed linear modules M2, M3 and M4 arranged in parallel can be performed in this embodiment. Such a transfer operation is controlled as follows.

Figure 5:
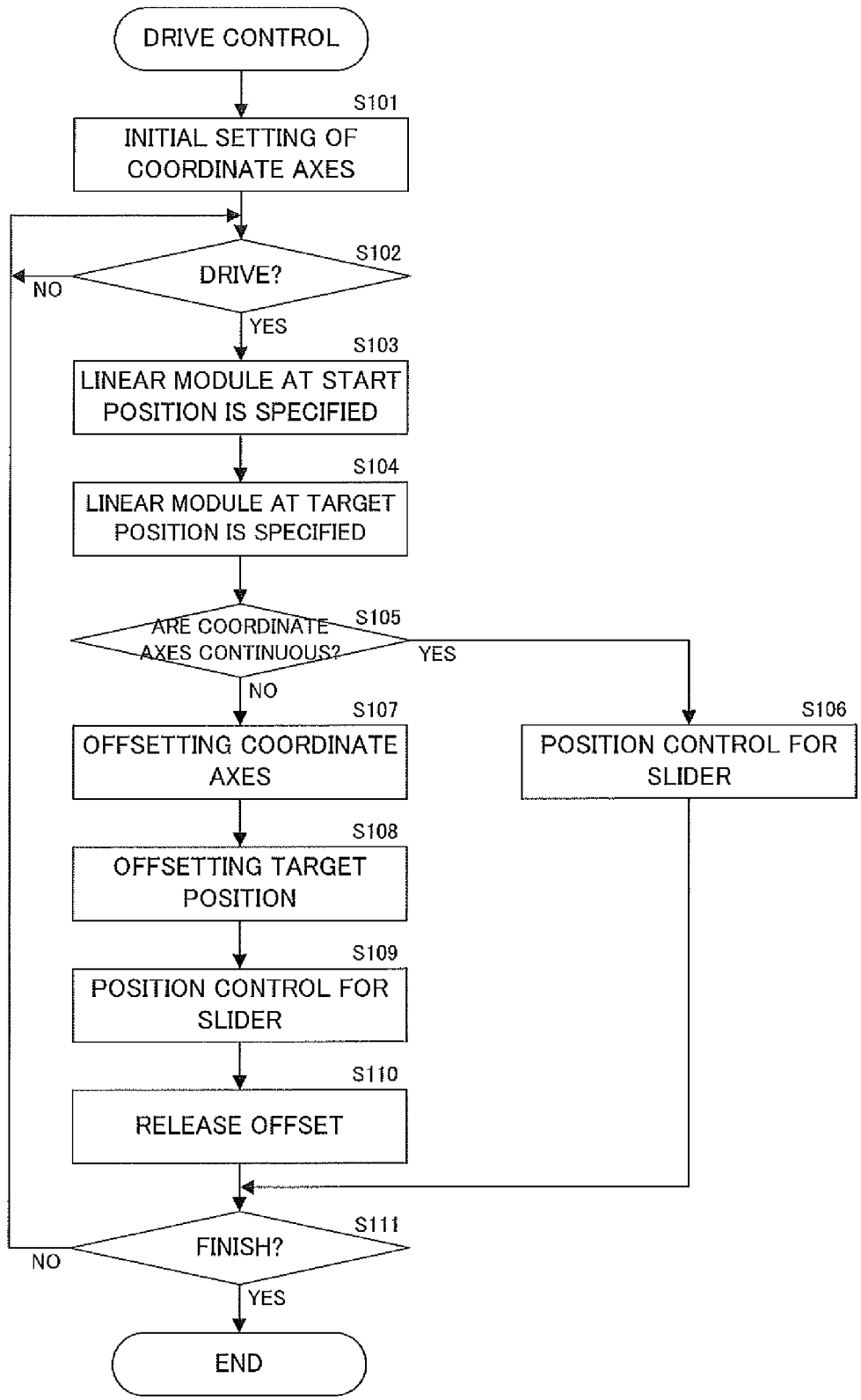
FIG. 5 is a flow chart showing an example of a drive control for the transfer operation performed in the linear conveyor system shown in FIG. 3.
Figure 6:
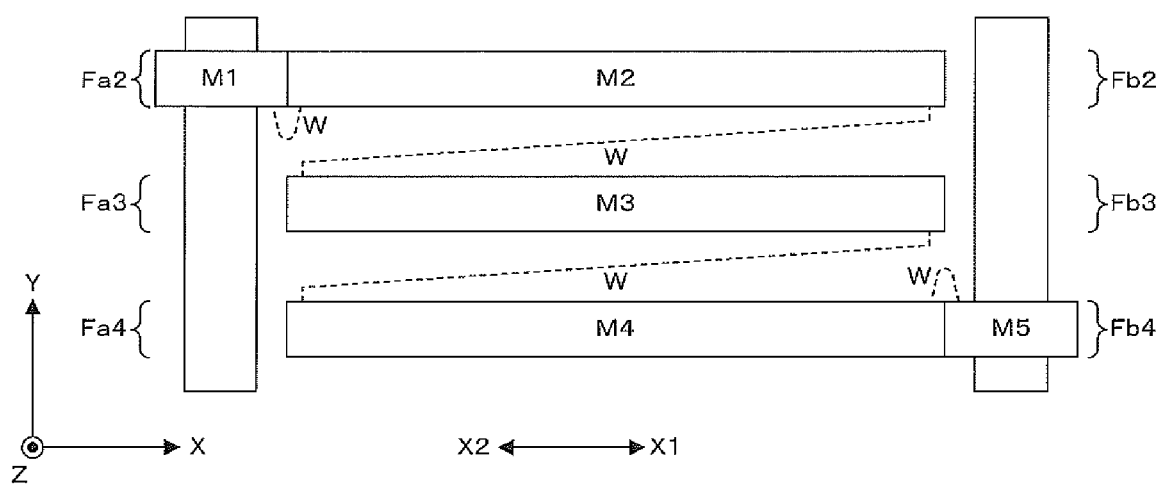
FIG. 6 is diagram schematically showing an example of initial setting made by the drive control shown in FIG. 5.
Figure 7:
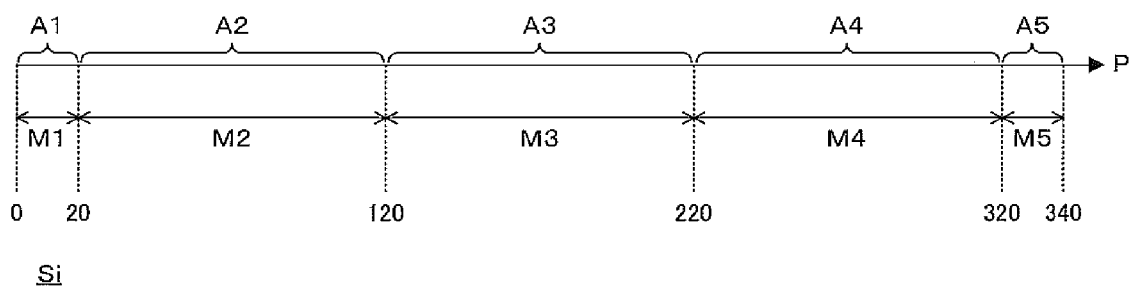
FIG. 7 is diagram schematically showing an example of initial setting made by the drive control shown in FIG. 5.
Figure 8:
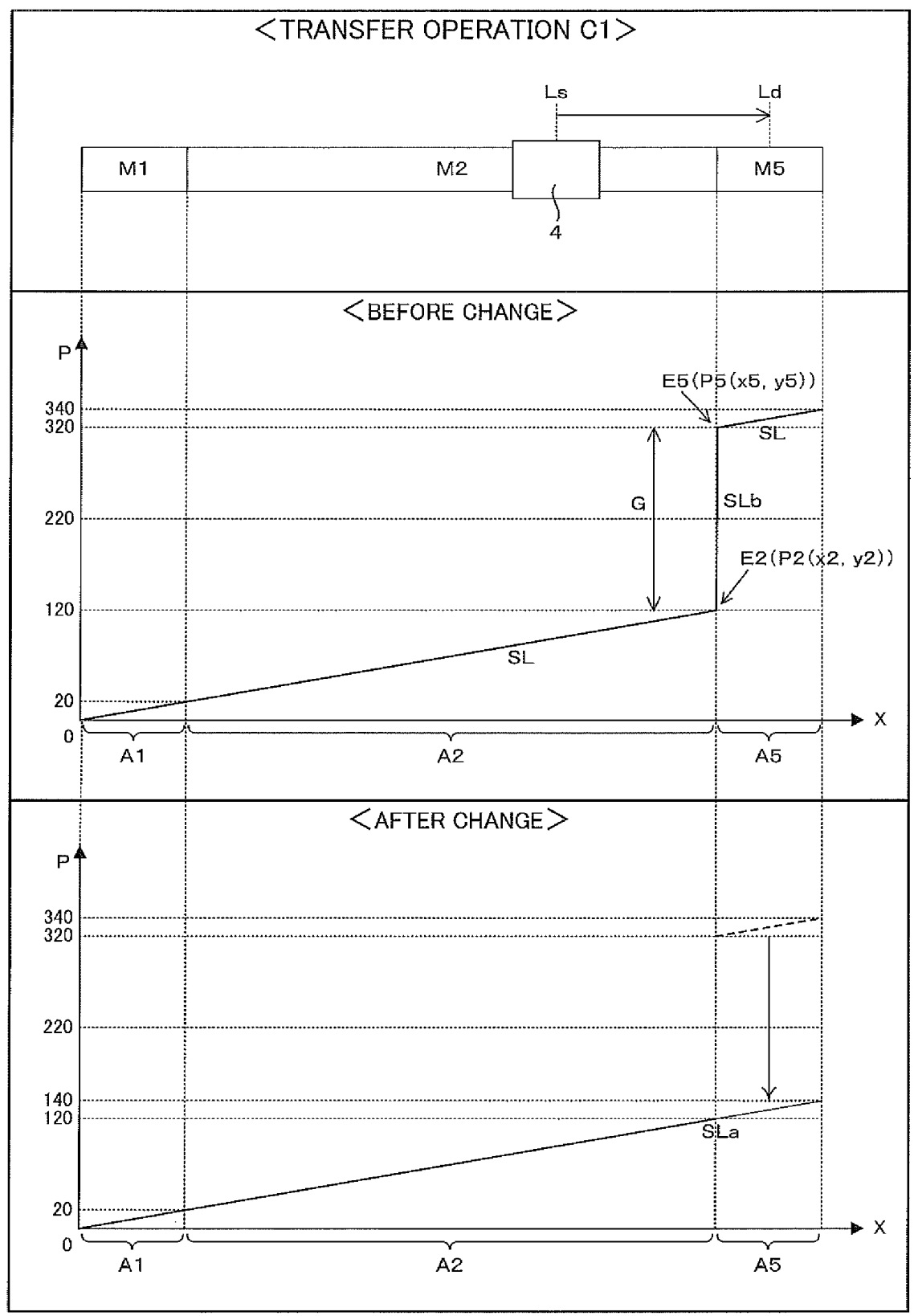
FIG. 8 is a chart schematically showing an example of the transfer operation performed by the drive control shown in FIG. 5.

FIG. 5 is a flow chart showing an example of a drive control for the transfer operation performed in the linear conveyor system shown in FIG. 3, FIGS. 6 and 7 are diagrams schematically showing an example of initial setting made by the drive control shown in FIG. 5, and FIG. 8 is a chart schematically showing an example of a control in the transfer operation performed by the drive control shown in FIG. 5. The flow chart of FIG. 5 is performed in accordance with the program 18 by the controller 12.

In Step S101, coordinate axes A1 to A5 are set for the respective linear modules M1 to M5 (initial setting of coordinate axes). The coordinate axes A1 to A5 have position coordinate values P which linearly (i.e. with a certain gradient SL) increase according to position changes from the X1 side toward the X2 side in the X direction and are individually set for the liner modules M1 to M5. Specifically, as shown in FIG. 6, the movable linear modules M1 to M5 are connected in series in this order by a wiring W, and a coordinate setting command is transmitted from the control device 11 to the linear module M1 on the most upstream side of a signal path, out of these linear modules M1 to M5. The linear module M1 having received the coordinate setting command sets, in itself, the coordinate axis A1 having position coordinate values P of "0 to 20" which linearly increase with the gradient SL from an end on the X1 side toward an end on the X2 side in the X direction. When the setting of the coordinate axis A1 is completed, the linear module M1 transmits the coordinate setting command, together with a maximum value (=20) of the position coordinate values P, to the linear module M2. The linear module M2 having received the coordinate setting command sets, in itself, the coordinate axis A2 having position coordinate values P of "21 to 120" which linearly increase with the gradient SL from an end on the X1 side toward an end on the X2 side in the X direction. Note that a minimum value (i.e. the first value) of the position coordinate values P set for the linear module M2 is a value consecutively following the maximum value of the position coordinate values P received from the linear module M1 on an upstream side. When the setting of the coordinate axis A2 is completed, the linear module M2 transmits the coordinate setting command, together with a maximum value (=120) of the position coordinate values P, to the linear module M3.

By repeating this,

The coordinate axis A1 having the position coordinate values P of "0 to 20" is set for the linear module M1, The coordinate axis A2 having the position coordinate values P of "21 to 120" is set for the linear module M2, The coordinate axis A3 having the position coordinate values P of "121 to 220" is set for the linear module M3, The coordinate axis A4 having the position coordinate values P of "221 to 320" is set for the linear module M4, and The coordinate axis A5 having the position coordinate values P of "321 to 340" is set for the linear module M5. Note that a change rate of changing the position coordinate value P with respect to a position change in the X direction, i.e. the gradient SL, is the same among the coordinate axes A1 to A5.

In this way, the drive control of the slider 4 can be executed in an initial set state Si where the coordinate axes A1 to A5 are so set that the position coordinate values P represented by the respective coordinate axes A1 to A5 of the plurality of linear modules M do not overlap each other. When the initial setting of the coordinate axes is completed in this way, whether or not to drive the slider 4 for the transfer operation is confirmed (Step S102). If it is judged in Step S102 to drive the slider 4 (YES), the linear module M having the coordinate axis A, to which a movement start position Ls (i.e. current position) of the slider 4 belongs (in other words, the linear module M engaged with the slider 4 stopped at the movement start position Ls) is specified (Step S103). Further, the linear module M having the coordinate axis A, to which a movement target position Ld of the slider 4 belongs (in other words, the linear module M engaged with the slider 4 having reached the movement target position Ld) is specified (Step S104).

Then, the continuity of the coordinate axis A of the linear module M specified in Step S103, to which the movement start position Ls belongs, and the coordinate axis A of the linear module M specified in Step S104, to which the movement target position Ld belongs, is judged (Step S105). Specifically, if a gradient SLb of a straight line connecting the position coordinate value P of an end of the coordinate axis A of the linear module M, to which the movement start position Ls belongs, on the side of the movement target position Ld and the position coordinate value P of an end of the coordinate axis A of the linear module M, to which the movement target position Ld belongs, on the side of the movement start position Ls matches the gradient SL indicating the change rate of the position coordinate values P on the coordinate axes A (A1 to A5), continuity is judged. Unless otherwise, discontinuity is judged.

For example, in the case of moving the slider 4 from the fixed linear module M4 to the movable linear module M5 facing the fixed linear module M4 (i.e. movable linear module M5 located in the facing position Fb4), the coordinate axis A4 of the fixed linear module M4 and the coordinate axis A5 of the movable linear module M5 are continuous. Thus, in Step S105, the continuity (YES) of the coordinate axes A4, A5 is judged and the position control of the slider 4 is executed in Step S106.

In Step S106, an operation profile for the position control is generated based on the coordinate axes A4, A5 having the consecutive position coordinate values P of "220 to 340". The operation profile shows the position of the slider 4 at each time. A position command value is periodically generated based on the operation profile. The position of the slider 4 is feedback-controlled based on a deviation between the position command value and detection value by the magnetic sensors 24 for detecting the position of the slider 4. In this way, a servo control is executed to cause the position of the slider 4 to follow the position command value. When the slider 4 reaches the movement target position Ld, whether or not to finish the drive control is judged (Step S111).

On the other hand, in a drive mode shown in a field "Transfer Operation C1" of FIG. 8, the slider 4 is driven from the movement start position Ls belonging to the coordinate axis A2 of the fixed linear module M2 to the movement target position Ld belonging to the coordinate axis A5 of the movable linear module M5 facing the fixed linear module M2 (i.e. the movable linear module M5 located in the facing position Fb2). In this case, as shown in a field "Before Change" of FIG. 8, the coordinate axis A2 of the fixed linear module M2 and the coordinate axis A5 of the movable linear module M5 are discontinuous, and a gap G is present between the position coordinate value P of an end E2 of the coordinate axis A2 on the side of the coordinate axis A5 and the position coordinate value P of an end E5 of the coordinate axis A5 on the side of the coordinate axis A2. Thus, it is judged in Step S105 that the coordinate axes A2, A5 are not continuous (NO) and advance is made to Step S107.

Specifically, in the example of the transfer operation C1, a gradient SLb (=(y5−y2)/(x5−x2)) between the coordinate value P2 (x2, y2) of the end E2 of the coordinate axis A2 (one coordinate axis) on the side of the coordinate axis A5 (other coordinate axis) and the coordinate value P5 (x5, y5) of the end E5 of the coordinate axis A5 (other coordinate axis) on the side of the coordinate axis A2 (one coordinate axis) is calculated. Then, whether the gradient SLb is equal to or different from the above gradient SL of each coordinate axis A2, A5 is judged. Since the gradient SLb and the gradient SL are different in this example, it is judged that the coordinate axes A2, A5 are not continuous.

In Step S107, as shown in a field "After Change" of FIG. 8, the coordinate axis A2 and the coordinate axis A5 are made continuous by offsetting the coordinate axis A5 of the movable linear module M5, to which the movement target position Ld belongs, by a gap G. That is, the position coordinate values P on the coordinate axis A5 are changed from "321 to 340" to "121 to 140". Here, the offset indicates an operation of uniformly increasing or decreasing the position coordinate values P represented by the object coordinate axis A by a certain value, i.e. parallelly moving the position coordinate values P in a direction (coordinate axis P) orthogonal to the X direction. Further, in Step S108, the position coordinate value P at the movement target position Ld is changed from the position coordinate value P based on the coordinate axis A5 before the change to the position coordinate value P based on the coordinate axis A5 after the change. As a result, a gradient SLa between the respective coordinate values P of the end E2 and the end E5 matches the above gradient SL of each coordinate axis A2, A5 and the coordinate axes A2 and A5 become continuous.

Then, the position control of the slider 4 in Step S109 is executed. In this Step S109, an operation profile for the position control is generated based on the coordinate axes A2, A5 having the consecutive position coordinate values P of "20 to 140". Then, a position command value is periodically generated based on this operation profile, and the position of the slider 4 is feedback-controlled based on a deviation between a detection value by the magnetic sensor 24 for detecting the position of the slider 4 and the position command value. In this way, a servo control for causing the position of the slider 4 to follow the position command value is executed.

When the slider 4 reaches the movement target position Ld, the offset of the coordinate axis A5 is released and the position coordinate values P on the coordinate axis A5 are returned from "121 to 140" after the change to "321 to 340" before the change. In Step S111, whether or not to finish the drive control is judged. Return is made to Step S102 unless the drive control is finished ("NO" in Step S111), whereas the flow chart of FIG. 5 is finished if the drive control is finished ("YES" in Step S111).

In the example shown above, the transfer operation C1 of moving the slider 4 between one fixed linear module M2 and the movable linear module M5 while locating the movable linear module M5 in the facing range Fb2 facing the one fixed linear module M2, out of the plurality of fixed linear modules M2, M3 and M4, is performed. At this time, a judgement process (Step S105) of judging whether or not the coordinate axis A2 (one coordinate axis) of the one fixed linear module M2 and the coordinate axis A5 (other coordinate axis) of the movable linear module M5 are continuous is performed. In the judgment process (Step S105), if it is judged before the transfer operation C1 (Step S109) that the coordinate axes A2, A5 are not continuous, the transfer operation C1 is performed (Step S109) after the coordinate axes A2, A5 are made continuous in the X direction (Step S107) by changing the coordinate axis A5 (object coordinate axis). Thus, it is possible to suppress the occurrence of a situation where the transfer operation C1 of moving the slider 4 between the fixed linear module M2 and the movable linear module M5 cannot be performed due to the discontinuity of the coordinate axes A2, A5 respectively set for the fixed linear module M2 and the movable linear module M5.

Further, the control device 11 performs the judgment process (Step S105) in the initial set state Si for setting the coordinate axes A2, A3, A4, A1 and A5 such that the position coordinate values P represented by the coordinate axes A2, A3, A4, A1 and A5 of the respective fixed linear modules M2, M3 and M4 and movable linear modules M1, M5 do not overlap each other. In such a configuration, a control (e.g. confirmation of the stop position of the slider 4) for the slider 4 before the start of the transfer operation C1 can be easily executed based on the coordinate axes A1 to A5 not overlapping each other, in other words, the coordinate axes A1 to A5 uniquely representing the positions in the X direction.

At this time, the control device 11 returns the coordinate axis A5 (object coordinate axis) to the one before the change after the transfer operation C1 is completed if the coordinate axis A5 (object coordinate axis) was changed (Step S110). In such a configuration, a control for the slider 4 after the completion of the transfer operation C1 can be easily performed based on the coordinate axes A1 to A5 not overlapping each other, in other words, the coordinate axes A1 to A5 uniquely representing the positions in the X direction.

Further, the control device 11 changes the movement destination coordinate axis A5 including the movement target position Ld of the slider 4, out of the coordinate axes A2 and A5. At this time, the control device 11 changes the position coordinate value P indicating the movement target position Ld (Step S108) as the movement destination coordinate axis A5 is changed. In this way, the transfer operation C1 of the slider 4 can be precisely performed by executing the position control to move the slider 4 to the movement target position Ld corresponding to the coordinate axis A5 after the change.

Further, the coordinate axes A1 to A5 represent the positions in the X direction by the position coordinate values P that linearly change with the predetermined gradient according to the position changes in the X direction. At this time, the control device 11 judges that the coordinate axes A2 and A5 are not continuous (Step S105) if the gradient between the position coordinate value P of the end E2 of the coordinate axis A2 on the side of the coordinate axis A5 and the position coordinate value P of the end E5 of the coordinate axis A5 on the side of the coordinate axis A2 is different from the gradient of the coordinate axes A1 to A5. In this way, the continuity of the coordinate axes A2, A5 can be easily judged.

As just described, in this embodiment, the linear conveyor system 1 corresponds to an example of a "linear conveyor system" of the disclosure, the control device 11 corresponds to an example of a "controller" of the disclosure, the program 18 corresponds to an example of a "control program for linear conveyor system" of the disclosure, the recording medium 19 corresponds to an example of a "recording medium" of the disclosure, the slider 4 corresponds to an example of a "slider" of the disclosure, the coordinate axes A1 to A5 correspond to an example of "coordinate axes" of the disclosure, the coordinate axis A2 corresponds to an example of "one coordinate axis" of the disclosure, the coordinate axis A5 corresponds to examples of an "other coordinate axis", an "object coordinate axis" and a "movement destination coordinate axis" of the disclosure, the position coordinate value P corresponds to an example of a "coordinate value" of the disclosure, the transfer operation C1 corresponds to an example of a "transfer operation" of the disclosure, the facing ranges Fa2 to Fa4, Fb2 to Fb4 correspond to examples of a "facing range" of the disclosure, the fixed linear modules M2, M3 and M4 correspond to an example of "fixed linear modules" of the disclosure, the fixed linear module M2 corresponds to an example of "one fixed linear module" of the disclosure, the movable linear modules M1, M5 correspond to examples of a "movable linear module" of the disclosure, each of a slider transfer mechanism Ta constituted by the movable linear module M1 and the actuator 5a and a slider transfer mechanism Tb constituted by the movable linear module M5 and the actuator 5b corresponds to an example of a "slider transfer mechanism" of the disclosure, the initial set state Si corresponds to an example of a "normal set state" of the disclosure, the movement start position Ls corresponds to an example of a "movement start position" of the disclosure, the movement target position Ld corresponds to an example of a "movement target position" of the disclosure, the X direction corresponds to an example of a "first direction" of the disclosure, and the Y direction corresponds to an example of a "second direction" of the disclosure.

Note that the disclosure is not limited to the above embodiment and various changes other than the aforementioned ones can be made without departing from the gist of the disclosure. For example, a transfer operation to which the drive control of FIG. 5 is applicable is not limited to the above transfer operation C1.

Figure 9:
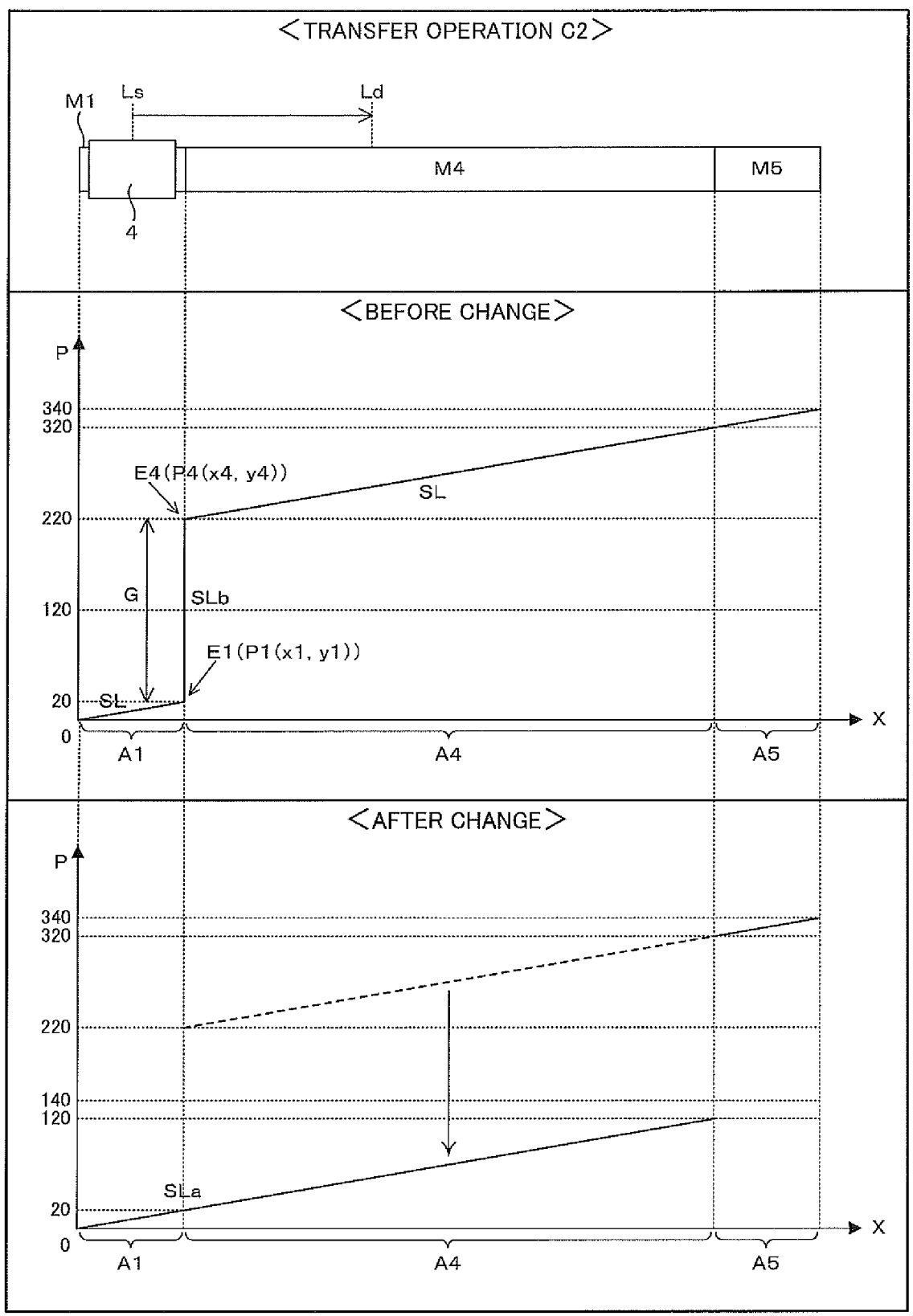
FIG. 9 is a chart schematically showing an example of a control in another transfer operation performed by the drive control shown in FIG. 5.

FIG. 9 is a chart schematically showing an example of a control in another transfer operation performed by the drive control shown in FIG. 5. In a drive mode shown in a field "Transfer Operation C2" of FIG. 9, the slider 4 is driven from the movement start position Ls belonging to the coordinate axis A1 of the movable linear module M1 located in the facing range Fa4 to the movement target position Ld belonging to the coordinate axis A4 of the fixed linear module M4 facing the movable linear module M1. In this case, as shown in a field "Before Change" of FIG. 9, the coordinate axis A1 of the movable linear module M1 and the coordinate axis A4 of the fixed linear module M4 are discontinuous, and a gap G is present between the position coordinate value P of the end E1 of the coordinate axis A1 on the side of the coordinate axis A4 and the position coordinate value P of the end E4 of the coordinate axis A4 on the side of the coordinate axis A1. Thus, it is judged in Step S105 that the coordinate axes A1, A4 are not continuous (NO) and advance is made to Step S107.

Specifically, in the example of the transfer operation C2, a gradient SLb (=(y4−y1)/(x4−x1)) between the coordinate value P4 (x4, y4) of the end E4 of the coordinate axis A4 (one coordinate axis) on the side of the coordinate axis A1 (other coordinate axis) and the coordinate value P1 (x1, y1) of the end E1 of the coordinate axis A1 (other coordinate axis) on the side of the coordinate axis A4 (one coordinate axis) is calculated. Then, whether or not the gradient SLb is equal to the above gradient SL of each coordinate axis A4, A1 is judged. Since the gradient SLb and the gradient SL are different in this example, it is judged that the coordinate axes A4, A1 are not continuous.

In Step S107, as shown in a field "After Change" of FIG. 9, the coordinate axes A1, A4 are made continuous by offsetting the coordinate axis A4 of the fixed linear module M4, to which the movement target position Ld belongs, by the gap G. That is, the position coordinate values P on the coordinate axis A4 are changed from "221 to 320" to "21 to 120". Further, in Step S108, the position coordinate value P at the movement target position Ld is changed from the position coordinate value P based on the coordinate axis A4 before the change to the movement target position Ld based on the coordinate axis A4 after the change (Step S108). As a result, the gradient SLa between the respective coordinate values P of the end E4 and the end E1 matches the above gradient SL of each coordinate axis A4, A1 and the coordinate axes A4 and A1 become continuous.

In Step S109, an operation profile for the position control is generated based on the coordinate axes A1, A4 having the consecutive position coordinate values P of "0 to 120". Then, a position command value is periodically generated based on this operation profile, and the position of the slider 4 is feedback-controlled based on a deviation between the position of the slider 4 detected by the magnetic sensors 24 and the position command value. In this way, the servo control for causing the position of the slider 4 to follow the position command value is executed. When the slider 4 reaches the movement target position Ld, the offset of the coordinate axis A4 is released and the position coordinate values P on the coordinate axis A4 are returned from "21 to 120" after the change to "221 to 320" before the change.

In the example described using FIG. 9, the transfer operation C2 of moving the slider 4 between one fixed linear module M4 and the movable linear module M1 while locating the movable linear module M1 in the facing range Fa4 facing the one fixed linear module M4, out of the plurality of fixed linear modules M2, M3 and M4, is performed. At this time, the judgement process (Step S105) of judging whether or not the coordinate axis A4 (one coordinate axis) of the one fixed linear module M4 and the coordinate axis A1 (other coordinate axis) of the movable linear module M1 are continuous is performed. In the judgment process (Step S105), if it is judged before the transfer operation C2 (Step S109) that the coordinate axes A4, A1 are not continuous, the transfer operation C2 is performed (Step S109) after the coordinate axes A4, A1 are made continuous in the X direction (Step S107) by changing the coordinate axis A4 (object coordinate axis). Thus, it is possible to suppress the occurrence of a situation where the transfer operation C2 of moving the slider 4 between the fixed linear module M4 and the movable linear module M1 cannot be performed due to the discontinuity of the coordinate axes A4, A1 respectively set for the fixed linear module M4 and the movable linear module M1.

Figure 10:
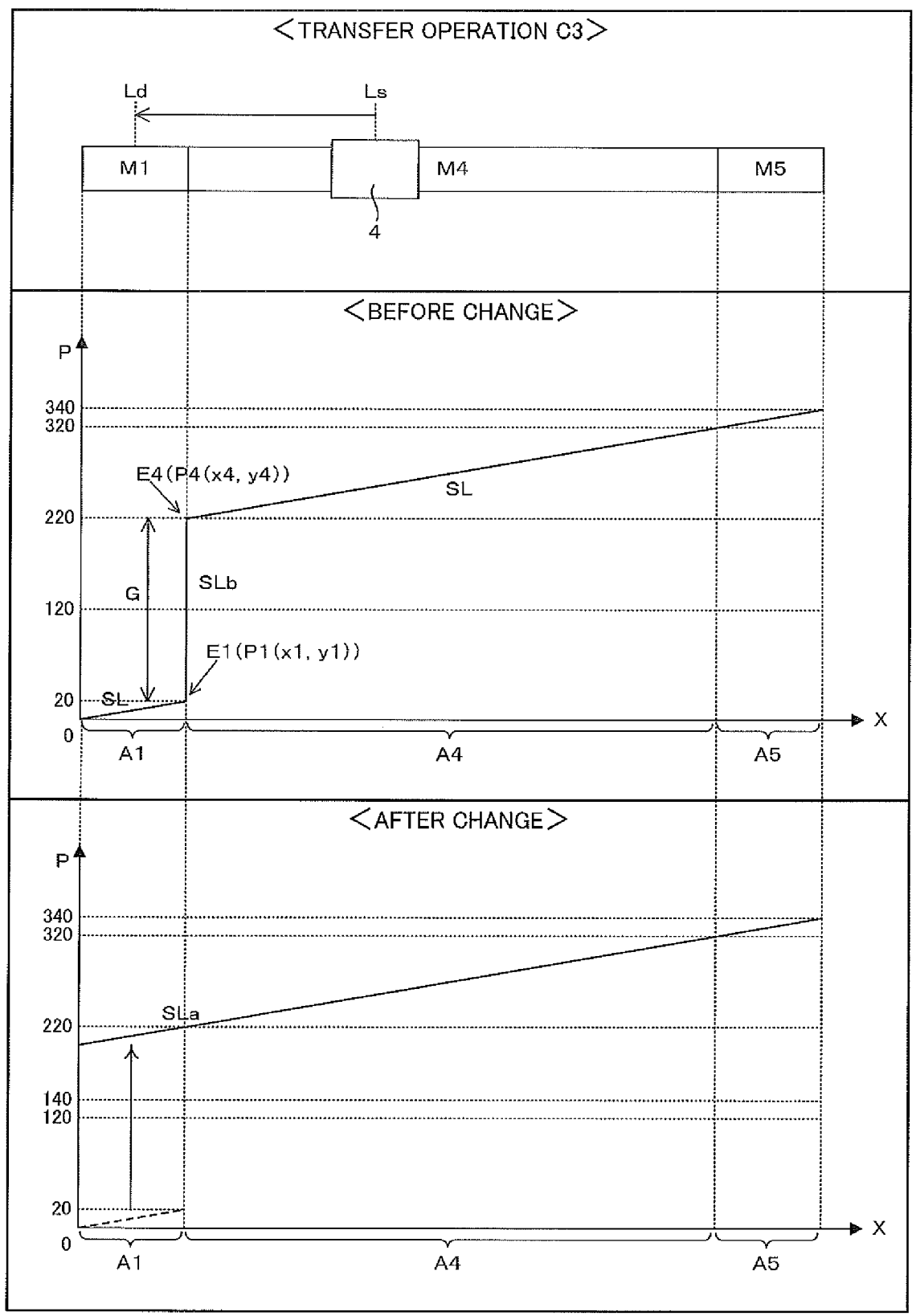
FIG. 10 is a chart schematically showing an example of a control in yet another transfer operation performed by the drive control shown in FIG. 5.

FIG. 10 is a chart schematically showing an example of a control in yet another transfer operation performed by the drive control shown in FIG. 5. In a drive mode shown in a field "Transfer Operation C3" of FIG. 10, the slider 4 is driven from the movement start position Ls belonging to the coordinate axis A4 of the fixed linear module M4 to the movement target position Ld belonging to the coordinate axis A1 of the movable linear module M1 located in the facing range Fa4 and facing the fixed linear module M4. In this case, as shown in a field "Before Change" of FIG. 10, the coordinate axis A4 of the fixed linear module M4 and the coordinate axis A1 of the movable linear module M1 are discontinuous, and a gap G is present between the position coordinate value P of the end E4 of the coordinate axis A4 on the side of the coordinate axis A1 and the position coordinate value P of the end E1 of the coordinate axis A1 on the side of the coordinate axis A4. Thus, it is judged in Step S105 that the coordinate axes A1, A4 are not continuous (NO) and advance is made to Step S107.

In Step S107, as shown in a field "After Change" of FIG. 10, the coordinate axes A4, A1 are made continuous by offsetting the coordinate axis A1 of the movable linear module M1, to which the movement target position Ld belongs, by the gap G. That is, the position coordinate values P on the coordinate axis A1 are changed from "0 to 20" to "200 to 220". Further, in Step S108, the position coordinate value P at the movement target position Ld is changed from the position coordinate value P based on the coordinate axis A1 before the change to the movement target position Ld based on the coordinate axis A1 after the change (Step S108).

In Step S109, an operation profile for the position control is generated based on the coordinate axes A1, A4 having the consecutive position coordinate values P of "200 to 320". Then, a position command value is periodically generated based on this operation profile, and the position of the slider 4 is feedback-controlled based on a deviation between the position of the slider 4 detected by the magnetic sensors 24 and the position command value. In this way, the servo control for causing the position of the slider 4 to follow the position command value is executed. When the slider 4 reaches the movement target position Ld, the offset of the coordinate axis A1 is released and the position coordinate values P on the coordinate axis A1 are returned from "200 to 220" after the change to "0 to 20" before the change.

In the example described using FIG. 10, the transfer operation C3 of moving the slider 4 between one fixed linear module M4 and the movable linear module M1 while locating the movable linear module M1 in the facing range Fa4 facing the one fixed linear module M4, out of the plurality of fixed linear modules M2, M3 and M1, is performed. At this time, the judgement process (Step S105) of judging whether or not the coordinate axis A4 (one coordinate axis) of the one fixed linear module M4 and the coordinate axis A1 (other coordinate axis) of the movable linear module M1 are continuous in the X direction is performed. In the judgment process (Step S105), if it is judged before the transfer operation C3 (Step S109) that the coordinate axes A4, A1 are not continuous, the transfer operation C3 is performed (Step S109) after the coordinate axes A4, A1 are made continuous in the X direction (Step S107) by changing the coordinate axis A1 (object coordinate axis). Thus, it is possible to suppress the occurrence of a situation where the transfer operation C3 of moving the slider 4 between the fixed linear module M4 and the movable linear module M1 cannot be performed due to the discontinuity of the coordinate axes A4, A1 respectively set for the fixed linear module M4 and the movable linear module M1.

Further, a combination of the movable linear module and the fixed linear module, for which the coordinate axis A is changed at the time of the transfer operation, is not limited to the above examples. That is, the coordinate axis A may be changed in performing the transfer operation in a combination of the movable linear module M1 and the fixed linear module M3, a combination of the movable linear module M1 and the fixed linear module M4, a combination of the movable linear module M5 and the fixed linear module M2 and a combination of the movable linear module M5 and the fixed linear module M3.

Further, in performing each of the above transfer operations C1, C2 and C3, the coordinates are made continuous by changing the coordinate axis A, to which the movement target position Ld belongs. However, the coordinates may be made continuous by changing the coordinate axis A, to which the movement start position Ls belongs.

Alternatively, the coordinate axes A1, A5 of the movable linear modules M1, M5 may be made variable and the change of the coordinate axes A2, A3 and A4 of the fixed linear modules M2, M3 and M4 may be prohibited. Conversely, the coordinate axes A2, A3 and A4 of the fixed linear modules M2, M3 and M4 may be made variable and the change of the coordinate axes A1, A5 of the movable linear modules M1, M5 may be prohibited.

Further, the set mode of the coordinate axes A1 to A5 in the initial set state Si is not limited to the above example. For example, the position coordinate values P may be set to increase in order of the coordinate axes A5, A4, A3, A2 and A1.

Further, an array direction of the fixed linear modules M2, M3 and M4 is not limited to the Y direction (horizontal direction) and may be the Z direction (vertical direction). In this case, the actuators 5a, 5b elevate and lower the movable linear modules M1, M5 in the Z direction.

Further, the number and arrangement of the fixed linear modules or movable linear modules may be changed as appropriate. Accordingly, the fixed linear module M3 may be omitted. Further, the linear conveyor system 1 may be configured to move the slider 4 along an L-shaped path composed of one fixed linear module M2 and one actuator 5a for driving the movable linear module M1. Alternatively, the fixed linear module M4 may be moved in parallel to the X direction from the state of FIG. 3 and arranged on a side opposite to the fixed linear modules M2, M3 with respect to the actuator 5b.

Further, driving directions of the slider 4 by the fixed linear modules Ma, 2b and driving directions of the slider 4 by the actuators 5c, 5d need not necessarily be orthogonal and may be oblique to each other.

What is claimed is:
1. A linear conveyor system, comprising:
a slider to be driven in a first direction;
a plurality of fixed linear modules arrayed in a second direction intersecting the first direction;
a movable linear module moving between a plurality of facing ranges arranged in the second direction while facing toward the plurality of fixed linear modules from the first direction, the movable linear module being configured to drive the slider in the first direction;
a slider transfer mechanism configured to convey the movable linear module between the plurality of facing ranges; and
a controller configured to set a coordinate axis representing positions in the first direction by coordinate values, the coordinate value changing according to a position change in the first direction, for each of the plurality of fixed linear module and the movable linear module and execute a position control based on the coordinate axes for the slider driven by the fixed linear module and the movable linear module,
wherein:
the slider is engageable with and disengageable from one end of each of the fixed linear modules and the movable linear module in the first direction, and the fixed linear modules and the movable linear module are configured to drive the engaged slider in the first direction,
the controller is configured to perform a transfer operation of moving the slider between the fixed linear module and the movable linear module after one coordinate axis and an other coordinate axis are made continuous in the first direction by changing at least one object coordinate axis of the one coordinate axis and the other coordinate axis if it is judged before the transfer operation that the one coordinate axis and the other coordinate axis are not continuous as a result of performing a judgment process of judging whether or not the one coordinate axis, which is the coordinate axis of the fixed linear module, and the other coordinate axis, which is the coordinate axis of the movable linear module, are continuous in the first direction, and
the coordinate axis represents the positions in the first direction by the coordinate values that linearly change with a predetermined gradient according to the position change in the first direction.

2. The linear conveyor system according to claim 1, wherein the controller is configured to perform the judgment process in a normal set state where the coordinate axes are so set that the coordinate values represented by the respective coordinate axes of the plurality of fixed linear modules and the movable linear module do not overlap each other.

3. The linear conveyor system according to claim 2, wherein the controller is configured to return the object coordinate axis to the one before a change after the transfer operation is completed if the object coordinate axis is changed.

4. The linear conveyor system according to claim 3, wherein the controller is configured to change a movement destination coordinate axis including a movement target position of the slider, out of the one coordinate axis and the other coordinate axis.

5. The linear conveyor system according to claim 4, wherein the controller is configured to change a coordinate value indicating the movement target position as the movement destination coordinate axis is changed.

6. The linear conveyor system according to claim 3, wherein the controller is configured to judge that the one coordinate axis and the other coordinate axis are not continuous if a gradient between the coordinate value of an end of the one coordinate axis on the side of the other coordinate axis and the coordinate value of an end of the other coordinate axis on the side of the one coordinate axis is different from the predetermined gradient.

7. The linear conveyor system according to claim 2, wherein the controller is configured to change a movement destination coordinate axis including a movement target position of the slider, out of the one coordinate axis and the other coordinate axis.

8. The linear conveyor system according to claim 7, wherein the controller is configured to change a coordinate value indicating the movement target position as the movement destination coordinate axis is changed.

9. The linear conveyor system according to claim 2, wherein the controller is configured to judge that the one coordinate axis and the other coordinate axis are not continuous if a gradient between the coordinate value of an end of the one coordinate axis on the side of the other coordinate axis and the coordinate value of an end of the other coordinate axis on the side of the one coordinate axis is different from the predetermined gradient.

10. The linear conveyor system according to claim 1, wherein the controller is configured to change a movement destination coordinate axis including a movement target position of the slider, out of the one coordinate axis and the other coordinate axis.

11. The linear conveyor system according to claim 10, wherein the controller is configured to change a coordinate value indicating the movement target position as the movement destination coordinate axis is changed.

12. The linear conveyor system according to claim 10, wherein the controller is configured to judge that the one coordinate axis and the other coordinate axis are not continuous if a gradient between the coordinate value of an end of the one coordinate axis on the side of the other coordinate axis and the coordinate value of an end of the other coordinate axis on the side of the one coordinate axis is different from the predetermined gradient.

13. The linear conveyor system according to claim 1, wherein the controller is configured to judge that the one coordinate axis and the other coordinate axis are not continuous if a gradient between the coordinate value of an end of the one coordinate axis on the side of the other coordinate axis and the coordinate value of an end of the other coordinate axis on the side of the one coordinate axis is different from the predetermined gradient.

14. A control method for a linear conveyor system with a slider to be driven in a first direction, a plurality of fixed linear modules arrayed in a second direction intersecting the first direction, a movable linear module being configured to move between a plurality of facing ranges arranged in the second direction while facing toward the plurality of fixed linear modules from the first direction, the movable linear module being configured to drive the slider in the first direction, and a slider transfer mechanism configured to convey the movable linear module between the plurality of facing ranges, the control method comprising:
  setting a coordinate axis for each of the plurality of fixed linear module and the movable linear module, the coordinate axis representing positions in the first direction by coordinate values, the coordinate value changing according to a position change in the first direction;
  performing a judgment process of judging whether or not one coordinate axis, the one coordinate axis being the coordinate axis of the fixed linear module, and an other coordinate axis, the other coordinate axis being the coordinate axis of the movable linear module, are continuous in the first direction;
  making the one coordinate axis and the other coordinate axis continuous in the first direction by changing at least one object coordinate axis of the one coordinate axis and the other coordinate axis if it is judged that the one coordinate axis and the other coordinate axis are not continuous as a result of the judgment process; and
  performing a transfer operation of moving the slider between the fixed linear module and the movable linear module by a position control based on the coordinate axes after the object coordinate axis is changed,
  wherein the coordinate axis represents the positions in the first direction by the coordinate values that linearly change with a predetermined gradient according to the position change in the first direction.

15. A computer readable medium storing a control program for a linear conveyor system with a slider to be driven in a first direction, a plurality of fixed linear modules arrayed in a second direction intersecting the first direction, a movable linear module configured to move between a plurality of facing ranges arranged in the second direction while facing toward the plurality of fixed linear modules from the first direction, the movable linear module being configured to drive the slider in the first direction, and a slider transfer mechanism configured to convey the movable linear module between the plurality of facing ranges, the control program causing a computer to:
  set a coordinate axis for each of the plurality of fixed linear module and the movable linear module, the coordinate axis representing positions in the first direction by coordinate values, the coordinate value changing according to a position change in the first direction;
  perform a judgment process of judging whether or not one coordinate axis, the one coordinate axis being the coordinate axis of the fixed linear module, and an other coordinate axis, the other coordinate axis being the coordinate axis of the movable linear module, are continuous in the first direction;
  make the one coordinate axis and the other coordinate axis continuous in the first direction by changing at least one object coordinate axis of the one coordinate axis and the other coordinate axis if it is judged that the one coordinate axis and the other coordinate axis are not continuous as a result of the judgment process; and perform a transfer operation of moving the slider between the fixed linear module and the movable linear module by a position control based on the coordinate axes after the object coordinate axis is changed, wherein the coordinate axis represents the positions in the first direction by the coordinate values that linearly change with a predetermined gradient according to the position change in the first direction.

\* \* \* \* \*